United States Patent
Che et al.

(10) Patent No.: US 7,119,537 B2
(45) Date of Patent: Oct. 10, 2006

(54) FULL TRACK PROFILE DERIVATIVE METHOD FOR READ AND WRITE WIDTH MEASUREMENTS OF MAGNETIC RECORDING HEAD

(75) Inventors: Xiaodong Che, Saratoga, CA (US); Terence Tin-Lok Lam, Cupertino, CA (US); Zhong-heng Lin, Santa Clara, CA (US); Xiaoyu Sui, Fremont, CA (US)

(73) Assignee: Hitachi Global Storage Technologies, Netherlands B.V., (NL)

( * ) Notice: Subject to any disclaimer, the term of this patent is extended or adjusted under 35 U.S.C. 154(b) by 127 days.

(21) Appl. No.: 10/956,950

(22) Filed: Sep. 30, 2004

(65) Prior Publication Data

US 2006/0066300 A1    Mar. 30, 2006

(51) Int. Cl.
G11B 5/127    (2006.01)
G11B 27/36    (2006.01)

(52) U.S. Cl. .................... 324/210; 360/31; 360/110
(58) Field of Classification Search ................ 324/210; 360/31, 110
See application file for complete search history.

(56) References Cited

U.S. PATENT DOCUMENTS

| | | | |
|---|---|---|---|
| 6,608,477 B1 | 8/2003 | Sacks et al. | 324/210 |
| 6,642,713 B1 | 11/2003 | Diederich | 324/210 |
| 6,680,609 B1 | 1/2004 | Fang et al. | 324/210 |
| 6,738,608 B1 | 5/2004 | Black et al. | 455/260 |
| 6,741,661 B1 | 5/2004 | Wheatley et al. | 375/296 |
| 6,741,861 B1 | 5/2004 | Bender et al. | 455/450 |
| 6,742,115 B1 | 5/2004 | Rose | 713/164 |
| 2002/0131188 A1 | 9/2002 | Hamaguchi et al. | 360/31 |
| 2003/0222645 A1 | 12/2003 | Church | 324/210 |

*Primary Examiner*—Bot LeDynh
(74) *Attorney, Agent, or Firm*—Zilka-Kotab, PC

(57) ABSTRACT

A method for measuring a magnetic read width MRW of a magnetic read sensor directly from the derivative of a full track profile, with better accuracy and more advantages than the micro-track method was invented and also there is no need to use a separate wide write head. The magnetic write width MWW of the write head, without the influence of sensor side reading, can also be obtained by this method along with the MRW with no additional calculations.

18 Claims, 4 Drawing Sheets

FULL TRACK PROFILE DERIVATIVE METHOD FOR READ AND WRITE WIDTH MEASUREMENTS OF MAGNETIC RECORDING HEAD

FIELD OF THE INVENTION

The present invention relates to magnetic read head track width measurement, and more specifically to a method for deriving a track width of a read head from the derivative of a full track profile.

BACKGROUND OF THE INVENTION

A main component of a computer is an assembly that is referred to as a magnetic hard disk drive, HDD. The HDD includes rotating magnetic disks, write and read heads that are suspended by a suspension arm adjacent to the surfaces of the rotating magnetic disks and an actuator that swings the suspension arm to place the read and write heads over selected circular tracks on the rotating disks. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in insulation layers (insulation stack), the insulation stack being sandwiched between first and second pole piece layers. A gap is formed between the first and second pole piece layers by a gap layer at the air bearing surface (ABS) of the write head and the pole piece layers are connected at the back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos\theta$, where $\theta$ is the angle between the magnetizations of the pinned and free layers. In the read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

A critical performance parameter for a read head or a write head is the magnetic track width that can be read or written by the head. A write head having the smallest possible magnetic write width (MWW) while having sufficient performance is of course desired. Similarly, magnetic read sensors are designed to have the smallest possible magnetic read width (MRW) while having sufficient signal amplitude to allow the largest possible density of data tracks to be recorded on a given magnetic disk.

Since the track width, (MRW, or MWW) is such a critical parameter, one can appreciate the importance of having an accurate means of measuring the MRW for a read sensor.

Magnetic read width, MRW, is defined as the half maximum width of reader response function in the cross track direction. The definition of reader response function should be:

$R(x)$=Lim(micro-track width-0)Amplitude of output signal$(x)$/width of micro-track.

Where x is the position of reader in the cross track direction and micro-track is a data track on the media with a width much narrower than MRW. Therefore, a current method, that has been used to measure a read head MRW and has currently been considered the best one, has required the creation of a micro track of data. A micro track is constructed by a multi-step process that involves first recording a magnetic track, also known as a full-track, and then erasing, or "shaving off" one or both sides of the data track, leaving just a very small portion of the track that is much narrower than the actual track width of the read head as well as the write head.

This micro-track is then read while moving the read sensor from side to side until the signal drops to ½ of that which it was at its peak value. The distance between those points is defined as the value of the MRW in this micro-track measurement.

The key to having accurate and reliable results using this method is to obtain a micro-track with fixed and narrow-enough track width. However, when track pitch becomes very narrow it is very difficult to obtain such a micro-track with strong enough signal relative to be background noise level and consistent micro-track width from run to run. This is exacerbated by several factors such as TMR (Track Misregistration), spindle runout, write width variation, etc, especially at high frequencies. There also remains a great deal of disagreement over what method should best be used to generate such a micro-track. For example, some researchers believe that the micro-track should be generated using a DC erase, while others prefer an AC erase. Whether the erasure should be made on one side or both sides of the full-track is still a controversial subject now.

Therefore, as track width becomes smaller, there is a strong felt need for a means for measuring the magnetic read width (MRW) of a read head directly from a full track profile, without the need for creating a micro-track. Such a means for measuring MRW would not only eliminate a lot of unnecessary confusion and arguments regarding how to generate a micro-track, but would also allow us to have much more accurate results for the measurement of very narrow track widths, such as those of current and future disk drive products. Such a means for measuring track width would also preferably be useful in a production disk drive, since the creation of a micro-track would not be necessary.

SUMMARY OF THE INVENTION

The present invention provides a method for deriving a reader response function directly from a full track profile. The method includes reading a full track profile, and calculating the derivative of the full track profile. The reader response function can then be derived from the derivative of the full track profile.

Once the reader response function has been calculated, the magnetic read width for the sensor can be calculated. This magnetic read width can be determined at the half of maximum value of the reader response function. A very accurate magnetic write width MWW, which is free from the influence of sensor side reading, can also be determined at the same time.

The present invention advantageously allows one to derive the reader response function and the magnetic read width MRW without first creating a micro-track. This is very important in that it allows one to determine the reader response function and MRW for a system having a track pitch that would be too narrow to create a practical micro-track.

Another advantage of the present invention is that it is straight forward to implement in head manufacture test line because a writer of the same tested head creates the above full-track profile, rather than to use a separate wide write head.

The present invention also advantageously allows one to determine the reader response function and MRW in either a finished production hard disk drive system or on a spin stand. Prior art methods for the measurement of MRW and reader response function are could only be performed on spinstands rather than disk drives.

These and other features and advantages of the invention will be better appreciated upon further reading of the detailed description.

BRIEF DESCRIPTION OF THE DRAWINGS

For a fuller understanding of the nature and advantages of this invention, as well as the preferred mode of use, reference should be made to the following detailed description read in conjunction with the accompanying drawings.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
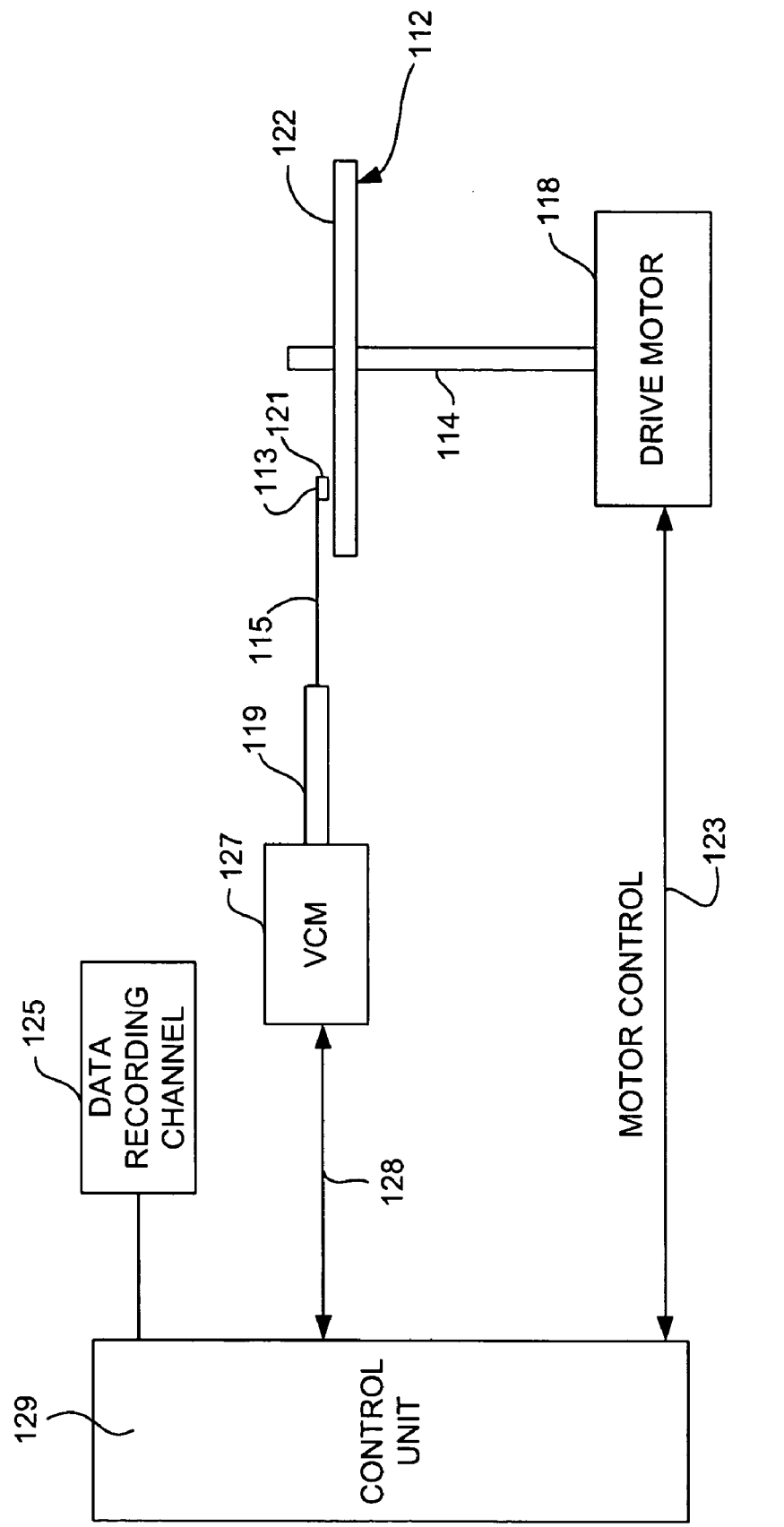
FIG. 1 is a schematic illustration of a disk drive system in which the invention might be embodied.

Referring now to FIG. 1, there is shown a disk drive 100 for which a reader response function and a magnetic read width MRW may be determined according to the present invention. As shown in FIG. 1, at least one magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
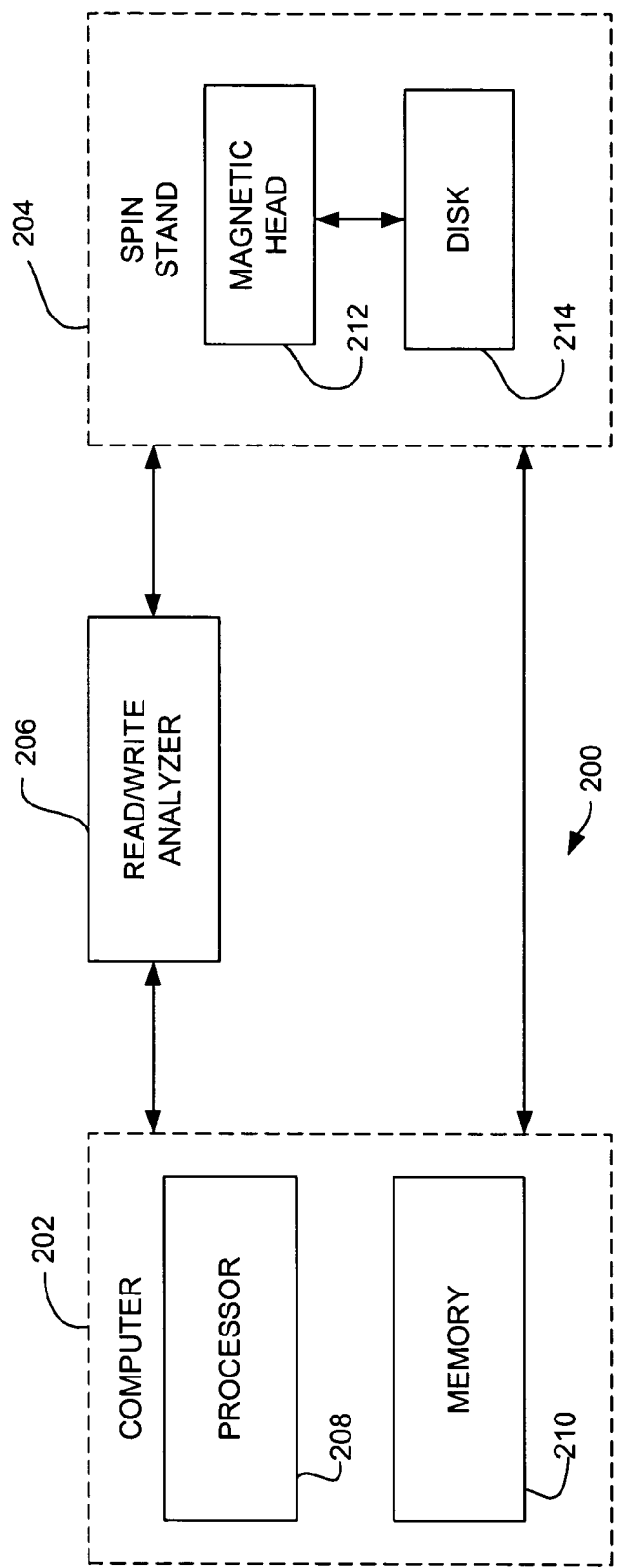
FIG. 2 is a schematic illustration of a spin stand test system in which the invention might be embodied.

With reference to FIG. 2, a system 200 for determining a magnetic track width of a magnetic head is shown. The system 200 includes a computer 202, a spinstand 204, and a read/write analyzer 206. Computer 202 is coupled to the spinstand 204 and read/write analyzer 206 through serial ports (not shown.). Spinstand 204, which includes a replaceable magnetic head 212 and a replaceable magnetic disk 214, is basically a conventional disk drive device used for determining the magnetic track width of a magnetic head. Such a spinstand 204 may be obtained from for example, a Guzik Technical Enterprises of Mountain View, Calif., U.S.A. (e.g., Model #S-1701B). The read/write analyzer 206 is basically a conventional signal analyzer device which serves to measure, read, and write signals to and from the spinstand 204. These signals are converted from digital to analog (D/A) and analog to digital (A/D) as necessary. Such a read/write analyzer 206 may be obtained from, for example, Guzik Technical Enterprises of Mountain View, Calif., U.S.A. (e.g., Model #RWA-2585S PMRL 1G).

Computer 202 may be a general purpose computer, such as a personal computer (PC), which includes one or more processors 208 (or controllers) and memory 210. Memory 210 may be a disk, such as a hard disk, computer diskette or compact disk (CD), or alternatively may be memory of an integrated circuit (IC) device or processor which is a permanent part of computer 202. Computer 202 includes software (i.e. computer instructions) which resides in memory 210 and provides general control for system 100. For example, the software instructs spinstand 204 to move the magnetic head 212 to particular positions on the magnetic disk 214, write data to disk 214 at particular frequencies, and read data from disk 214. Given the appropriate track profile data, the computer instructions also perform calculations to determine the magnetic track width of magnetic head 212 in accordance with the present invention. The logic and calculations performed by the software are described below in detail. The software may be implemented in any suitable computer language, such as visual Basic or Visual C++. The track width calculation methods of the present invention can be performed on either the disk drive system 100 described with reference to FIG. 1, or on a spin stand system 200 as described with reference to FIG. 2.

Figure 3:
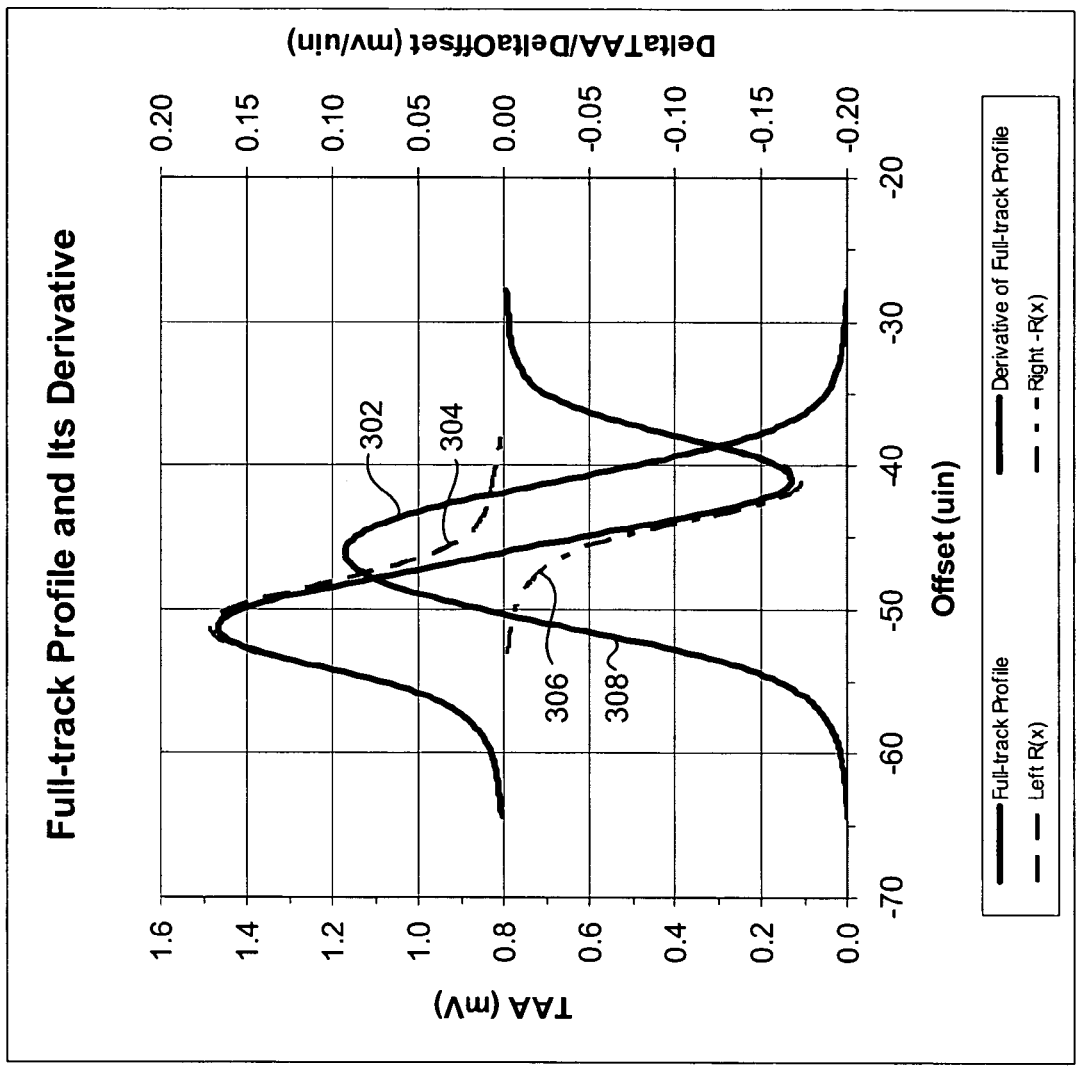
FIG. 3 is a graphical representation of the relationship between a full track profile and its derivative.

With reference now to FIG. 3, a full track profile 302 is illustrated. The full track profile is the amplitude of playback signal from read sensor when the head moves across the track in a direction perpendicular to the longitudinal direction of the track itself (the cross track direction). Since the full track profile is not an ideal rectangular or trapezoidal function, an approximation of the write width MWW without side-reading correction can be chosen as the point along the track at which the signal is ½ of its peak strength, assuming MRW is less than MWW.

As discussed above, the measurement of a magnetic read width MRW of a read head is not an easy matter. A magnetic head has a read profile, called the cross-track reader response function R(x) that can be defined as a function of the magnetic response of the sensor along the cross track direction when reading magnetic write track of infinitely narrow width (ie. as MWW approaches 0). Of course such an infinitely narrow track width cannot actually exist. As discussed above, previous methods for measuring the magnetic read width (MRW) as well as the reader response function have involved reading a micro-track. This micro-track attempts to simulate to some extent an infinitely narrow track. A micro-track is a track of data that has had one or both of its sides erased, or shaved off, to produce a very narrow track of data. However, as functional track widths of readers become smaller there comes a point at which the creation of such micro-tracks becomes impossible due to the reasons mentioned in the previous section. The present invention, therefore, provides a means for deriving the reader response function R(x) and its width at half of its maximum (i.e. the magnetic read width (MR O)) directly from the full track profile of the recorded magnetic signal. With reference again to FIG. 3 a relationship between the full track profile 302 and the difference between two reader response functions R(x) 304 and R(x-MWW) 306 as a derivative of the full track profile 308 is illustrated.

The relationship between the full track profile F(x) 302 and the reader response function R(x) 304 is defined by $F(x)=\int R(y)M(x-y)dy=\int R(y)[\vartheta(x-y)-\vartheta(x-y-MWW)]dy$, where x is the read head offset in the cross track direction and $\vartheta(x)$ is a step function if we take rectangular shape for magnetization of data track as a first order approximation. Taking the derivative on both sides, the above equation becomes: $DF(x)=R(x)-R(x-MWW)$, where $DF(x)$ is the derivative of the full track profile. It is composed of two identical reader response functions with opposite signs and separated by a distance of MWW.

There are two ways to calculate MRW. To better understand the first method, consider the following. For left reader response function, the above formula can be rearranged to $R(x)=DF(x)+R(x-MWW)$. For the right reader response function, let $x=x+MWW$, then $R(x)=R(x+MWW)-DF(x+MWW)$. This formula can be called "formula A". $R(x-MWW)$ and $R(x+MWW)$ are determined using previously calculated R(x) in earlier recursion steps, assuming $R(x) \cong DF(x)$ for such x locations: the distance from them to the nearest edge of full track profile is less than MWW. The second way of deriving MRW involves adding the three above formulas together, resulting in $R(x)-R(x-3MWW)=DF(X)+DF(X-MWW)+DF(x-2MWW)=SumDF(x)$. This formula can be called "formula B". The functions on the right side (or middle of the formula can be obtained from experimentally measured data. One can then construct two reader response functions that are separated by 3MWW. Finally MRW and MWW can be calculated from the two separate R(x) functions.

The advantage of the second method is that, for the case of large asymmetry between the two sides of a full-track profile, a modified method can be employed to reduce calculation error caused by incomplete cancellation between the left and right read response functions. The modified second method can be described as follows.

First, we need to distinguish left and right reader response functions separately and rewrite DF(x) in the format: $DF(x)=R_L(x)-R_R(x-MWW)$ and also to construct a reversed DF(x) function as follows:

$$DFr(x)=-DF(-x+MWW)=R_R(-x)-R_L(-x+MWW)=R_R(x)-R_L(x-MWW),$$

if asymmetry of $R_L(x)$ and $R_R(x)$ is small. Next, we can obtained two left or two right read response functions separated by 2MWW: $SumDF2(x)=DF(x)+DFr(x-MWW)=R_L(A)-R_L(x-2MWW)$ and $SumDFr2(x)=DFr(x)+DF(x-MWW)=R_R(X)-R_R(x-2MWW)$.

Add SumDF2(x) and SumDFr2(x) together, we have: $SumDF4(x)=SumDF2(x)+SumDF2(x-2MWW)=R_L(A)-R_L(x-4MWW)$ and $SumDFr4(x)=SumDFr2(x)+SumDFr2(x-2MWW))=R_R(X)-R_R(x-4MWW)$.

Finally, by averaging the two sides of the above two equations, two averaged read response functions $R_A(X)$ separated by 4MWW will be obtained:

$\{SumDF4(x)+SumDF4(x)\}/2=R_A(x)-R_A(x-4MWW)$.

Figure 4:
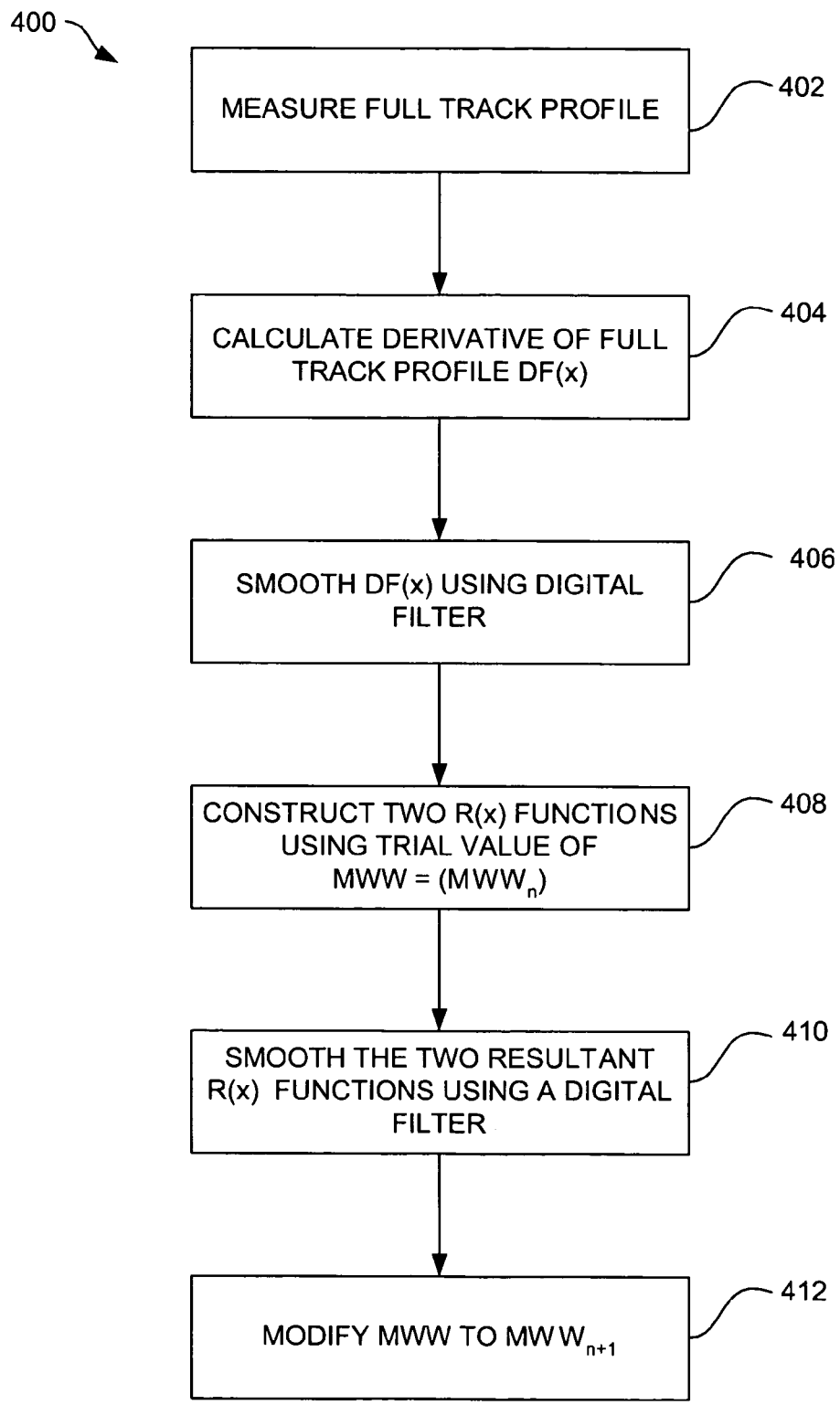
FIG. 4 is a flow chart illustrating a method according to the present invention.

With reference to FIG. 4, a method 400 for determining R(x) and MRW can be summarized as follows. In a first step 402 a full track profile is measured. Then in a step 404 the derivative of the full track profile DF(x) is calculated. In a step 406 a digital filter may be used, in time domain or frequency domain, to smooth DF(x) to reduce noise caused by experimental error and noise enhancement from the derivative operation. The correct use of digital filtering is critical for the success of this invention.

Then in a step 408, use formula A or formula B from above to construct two R(x) functions using a first trial value of MWW called $MWW_n$. Then $MRW_L$ and $MRW_R$ are calculated from the two resultant R(x) functions, and a new value of $MWW_{n+1}$ is calculated from the separation between the two R(x) functions.

In a step 410 a digital filter can again be used to smooth the two resultant R(x) functions, denoted by SR(x) and a Delta, denoted by Dm, can be calculated as the deviation of the two original R(x) functions from the two smoothed SR(x) functions. Then in step 412, the value of MWW, can be decreased by a small amount, resulting in a new MWW value, $MWW_{n+1}$. Then steps 408 and 410 can be repeated using the new value of $MWW_{n+1}$.

Step 410 can be repeated until an acceptably low difference between $MWW_{n1}$ and $MWW_{n+1}$ is obtained or until an acceptably low value of Dm is obtained. From Dm or the criteria $MWW_n = MWW_{n+1}$, the track width of the read head is determined as $MRWd = (MRW_L + MRW_R)/2$ and the track width of the write head is $MWWd = MWW_{n+1}$. It should be pointed out that the method described above can be performed either in a disk drive system 100 (FIG. 1) or in a spin stand test system 200 (FIG. 2). The method for carrying out the invention can be included as computer readable instructions recorded on a computer readable memory, which can then be read by a computer to carry out the above described method 400.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining a magnetic read width (MRW) of a read head, comprising:
    recording a data track, having a full track profile;
    reading the full track profile of the data track;
    calculating the derivative of the full track profile (DF);
    selecting a first trial magnetic write width ($MWW_n$);
    deriving two reader response functions R(x) from $R(x) = DF(x) + R(x - MWW_n)$ and $R(x) = R(x + MWW_n) - DF(x + MWW_n)$ respectively; and
    determining a magnetic read width (MRW) from at least one of the reader response functions.

2. A method as in claim 1, wherein the first trial value of $MWW_n$ is determined from a half maximum of the full track profile.

3. A method as in claim 1, further comprising:
    determining an amount of error in $MWW_n$;
    if the error in $MWW_n$ is greater than a predetermined amount, selecting a new value of $MWW = (MWW_{n+1})$; and
    deriving two reader response functions R(x) from $R(x) = DF(x) + R(x - MWW_{(n+1)})$ and $R(x) = R(x + MWW_{(n+1)}) - DF(x + MWW_{(n+1)})$.

4. A method as in claim 1 wherein $MWW_{(n+1)}$ is less than $MWW_n$.

5. A method as in claim 1, wherein the full track profile is determined by measuring the magnetic signal at a plurality of locations in the cross track direction.

6. A method as in claim 3, wherein the error in MWW is determined by calculating a difference between $MWW_n$ and a resultant value of $MWW_{(n+1)}$.

7. A method as in claim 1, further comprising determining a magnetic read width (MRW) from a half of maximum value of the reader response function R(x).

8. A method as in claim 1, wherein the reader response function R(x) is determined for a read head incorporated within a disk drive.

9. A method as in claim 1, wherein the reader response function R(x) is determined for a read head, by mounting the read head within a spin stand testing apparatus.

10. A method for determining a magnetic read width (MRW) of a read head, comprising:
    recording a data track, having a full track profile;
    reading the full track profile of the data track;
    calculating the derivative of the full track profile (DF);
    selecting a first trial magnetic write width ($MWW_n$);
    deriving a reader response function R(x) from $R(x) - R(x - 3MWW) = DF(x) + DF(x - MWW_n) + DF(x - 2MWW_n) = SumDF(x)$; and
    determining a magnetic read width MRW from the reader response function.

11. A method as in claim 10, further comprising:
    determining an amount of error in $MWW_n$;
    if the error in $MWW_n$ is greater than a predetermined amount, selecting a new value of $MWW = (MWW_{n+1})$; and
    deriving a new reader response function R(x) from $R(x) - R(x - 3MWW) = DF(x) + DF(x - MWW_{n+1}) + DF(x - 2MWW_{n+1}) = SumDF(x)$.

12. A method as in claim 10 wherein the initial value of MWW is selected from the half of maximum value of the full track profile.

13. A method as in claim 10 wherein $MWW_{n+1}$ is less than $MWW_n$.

14. A method as in claim 10 wherein the full track profile is determined by measuring the magnetic signal at a plurality of locations in the cross track direction.

15. A method as in claim 13, wherein the error in $MWW_n$ is determined by calculating a difference between $MWW_n$ and a resultant value of $MWW_{(n+1)}$.

16. A method as in claim 10, wherein the magnetic read width (MRW) is determined from a half of maximum value of the reader response function R(x).

17. A method as in claim 10, wherein the reader response function R(x) is determined for a read head incorporated within a disk drive.

18. A method as in claim 10, wherein the reader response function R(x) is determined for a read head, by mounting the read head within a spin stand testing apparatus.

* * * * *